March 13, 1945.　　　M. H. LEES, JR　　　2,371,452
RIVET
Filed March 14, 1944　　　2 Sheets-Sheet 1

INVENTOR
MILTON H. LEES JR.
BY R. Craig
ATTORNEY

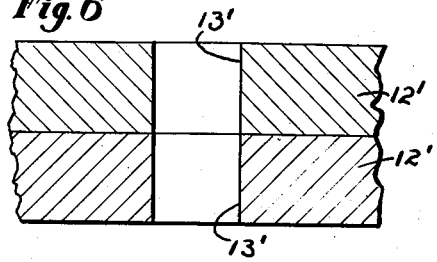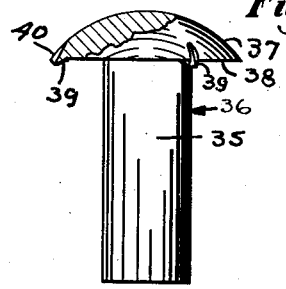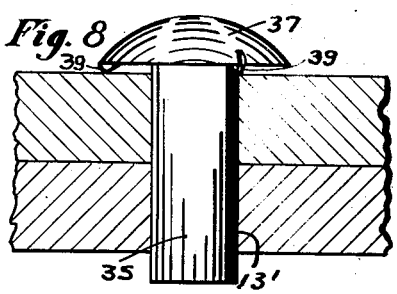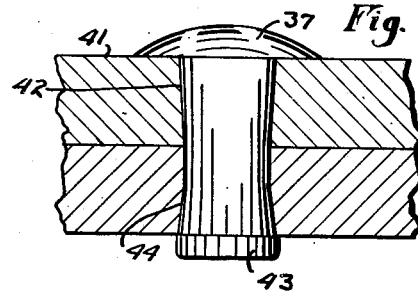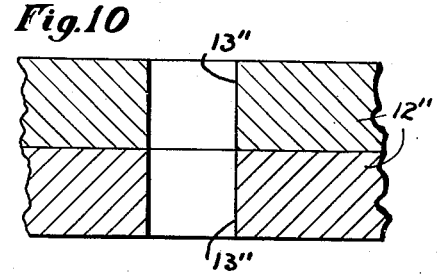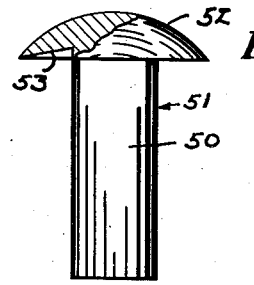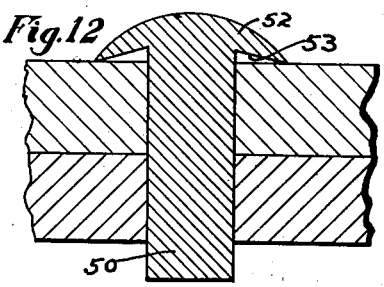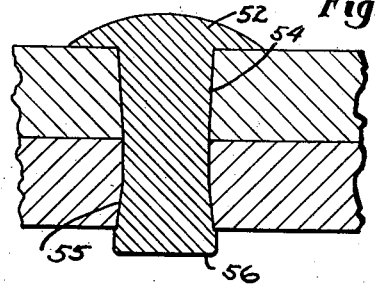

Patented Mar. 13, 1945

2,371,452

UNITED STATES PATENT OFFICE 2,371,452

RIVET

Milton H. Lees, Jr., Pasadena, Calif.

Application March 14, 1944, Serial No. 526,405

1 Claim. (Cl. 85—40)

This invention relates to rivets.

In the usual riveting operation the rivet is pushed into the hole until the lower surface of the rivet head contacts the surface of the material being riveted. The shank at the end remote from the head is then upset to set the rivet. Since the head engages the material of the shank at the headed end of the rivet the latter cannot move as the rivet is being set. The shank end of the rivet, however, is free to move into the hole and is slightly forced into the hole during the upsetting operation, thus the material is not evenly distributed at both ends of the rivet hole.

According to my invention I provide means for holding the rivet temporarily in such manner that both ends of the rivet simultaneously move into the hole during the riveting operation.

It is, therefore, the general object of my invention to provide an improved rivet which permits even distribution of metal in the sheets being riveted.

A more specific object of the invention is to provide a rivet which includes means to prevent the trailing end of the rivet from fully entering the rivet hole when the rivet is first inserted, thus permitting further movement of the rivet into the hole during the riveting operation, the result being that metal is evenly distributed and the rivet is more firmly secured in place.

A more specific object of the invention is to provide a rivet including means on the head end thereof for preventing the rivet from moving fully into a hole until the riveting operation begins.

A more specific object of the invention is to provide a rivet having a mushroom type head with the edge of the head undercut so that it will temporarily limit the movement of the shank into the hole.

Another object of the invention is to provide a rivet including a head having deformable protuberances thereon which limit the movement of the shank into the hole when the rivet is first inserted in place.

A further object of my invention is to provide a novel method of riveting.

Other objects and advantages of the invention will be apparent from the following description taken in connection with the accompanying drawings, wherein:

Fig. 6 is a view similar to Fig. 1;

Fig. 7 is a side elevation, partly in section, showing a modified rivet;

Fig. 8 shows the modified rivet after preliminary insertion;

Fig. 9 shows the modified rivet after it is set;

Fig. 10 is a view similar to Fig. 1;

Fig. 11 is a side elevation, partly in section, showing a further modified rivet;

Fig. 12 shows a further modified rivet after initial insertion, and

Fig. 13 shows the further modified rivet in set condition.

Figure 1:
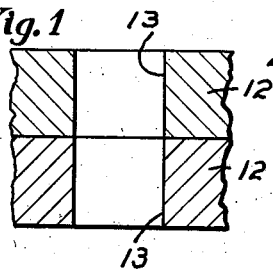
Fig. 1 is a fragmentary sectional view showing two layers of material with aligned rivet holes therein.

Referring to the drawings by reference characters, I have shown my invention as embodied in a rivet which is indicated generally at 10. As shown the rivet is of the mandrel extrusion type and is employed in securing layers of material such as 12 together. These layers are preferably of relatively soft metal and are provided with aligned apertures 13 which are of a diameter to receive the shank 14 of the rivet. The rivet shown is hollow, having a bore 15, and is provided with a mushroom head 16 with a bevelled surface 17 at the intersection of the head and the bore 15.

The head 16 is generally rounded as at 18 on the upper surface and the lower surface 19 is in the shape of a truncated cone with the apex directed upwardly and intersecting the shank at 20 while the lower or outer end of the truncated portion forms a sharp edge 21 where it meets the rounded upper surface 18 of the rivet.

The mandrel member 11 includes a shank 22 having a head 23 thereon. The head is shown as rounded as at 24 and has an undercut groove 25 whereby a deformable rim portion 26 is provided. The shank is tapered as at 27 adjacent the head with the diameter decreasing towards the free end of the shank. Adjacent to the end of the tapered portion a shank is provided with a peripheral groove 28 and spaced from the first groove 28 the shank has a second peripheral groove 29.

In operation the shank member is inserted in the bore 15 of the rivet and the latter is arranged in the apertures 13 of the material to be united. A pull member 31 having pivoted jaws 32 thereon is then arranged so that its head 33 engages the head 16 of the rivet. The pull member is operated (by means not shown) thus causing the head 33 of the pull member to push downwardly on the head 16 of the rivet while the jaws 32 pull the mandrel member upwardly so that the parts assume the position shown in Fig. 5.

Figure 4:
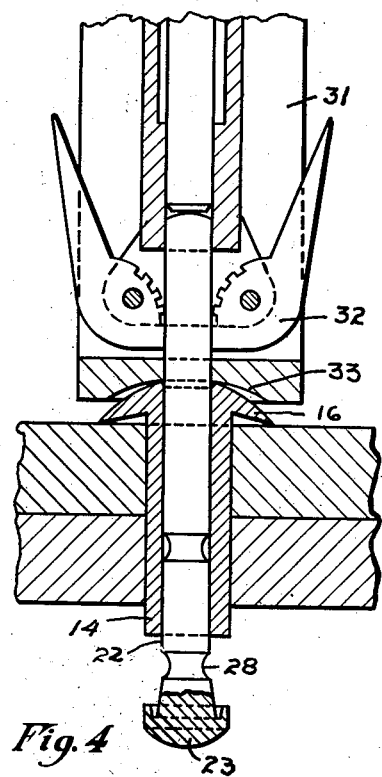
Fig. 4 is a sectional view showing the rivet inserted and about to be set.
Figure 5:
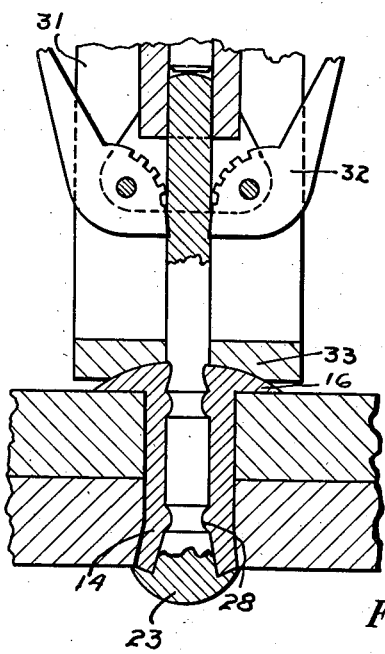
Fig. 5 shows the rivet in set position prior to the removal of the shank.

The pushing of the head 16 downwardly causes the tubular portion of the rivet adjacent to the head to be forced inwardly into the aperture 13 and fills the groove 29 while the head shifts from the position of Fig. 4 to the position of Fig. 5. At the same time the tapered portion 27 of the mandrel enters the lower end of the rivet and forces this lower end outwardly into the groove 25 and also forces the surplus metal into the groove 28. The lower end of the rivet shank is expanded as shown in Fig. 5. Simultaneously the deformable rim 26 engaging the end of the rivet is forced outwardly to the position shown in Fig. 5 so that it covers the end of the socket member as shown.

After the rivet is secured in position as shown in Fig. 5 the pull member 31 is removed and the mandrel shank is cut off.

In the modification shown in Figs. 6 to 9, inclusive, the layers 12' are provided with aligned apertures 13' into which the shank 35 of a rivet 36 is inserted. The rivet 36 has a rounded head 37 which has a planar lower face 38.

The head 37 at the periphery is provided with a plurality of downwardly punched tongues 39 which extend below the face 38 as shown in Figs. 7 and 8. Slots 40 are formed when the tongues 39 are punched.

In operation the rivet is inserted as shown in Fig. 8 and is then set. The setting operation causes the head 37 to move against the upper surface 41 of the adjacent layer 12' and in doing this the tongues or protuberances are smoothed out. The forcing of the headed end of the shank into the hole causes the shank to be tapered as at 42, while the forming of the head 43 also causes the portion of the shank remote from the head 37 to be tapered as at 44.

The setting of the rivet will thus be seen to be accomplished while the inner and outer end portions of the shank are forced slightly into the aligned holes so that the resultant distribution of metal provides a very secure setting for the rivet.

Figure 2:
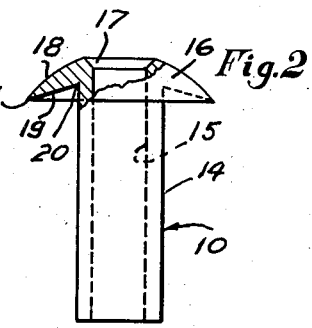
Fig. 2 is a side elevation, partly in section, showing my invention as applied to a rivet of the mandrel extrusion type.
Figure 3:
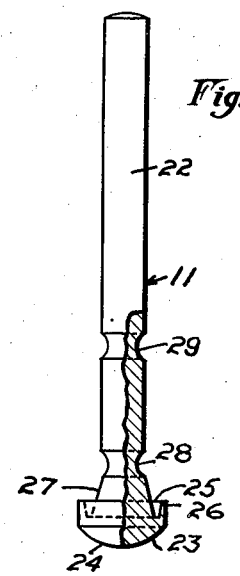
Fig. 3 is a side elevation, partly in section, showing the mandrel.

In Figs. 10 to 13, inclusive, I show layers 12" which are provided with aligned apertures 13" to receive the shank 50 of a rivet 51 which has a rounded head 52. The lower surface 53 of the rivet 51 is in the shape of a truncated cone similar to the surface 19 shown in Fig. 2 and described above.

The rivet 51 is inserted in the holes 13" as shown in Fig. 12 and the head takes the position there shown. During the riveting operation the head is moved downwardly causing the portion of the shank adjacent to the head to move inwardly thus causing it to assume a tapered configuration as indicated at 54.

In setting the rivet the portion of the shank remote from the head 52 moves inwardly in the hole and forms a tapered portion 55 as the end of the rivet is upset as at 56.

From the foregoing description it will be apparent that I have invented a novel rivet and a method of riveting which are simple and highly efficient for the intended purpose.

Having thus described my invention, I claim:

A rivet including a head and a shank, said shank being cylindrical, said head having a rounded upper surface, the entire lower surface of said head being frusto-conical with the apex of the cone frustum directed upwardly and directly intersecting the shank at an acute angle and with the bottom of the cone frustum intersecting the rounded head so that a depending overhanging edge portion is provided on the rivet head, the edge portion serving to limit the movement of the head towards the material when the rivet shank is inserted in a hole, the construction permitting the end portion of the shank which is adjacent to the head to be forced outwardly and expanded into the hole as the rivet is secured in place.

MILTON H. LEES, JR.